US009294150B2

(12) United States Patent
Ganesan et al.

(10) Patent No.: US 9,294,150 B2
(45) Date of Patent: Mar. 22, 2016

(54) INFORMATION RELAY MECHANISM USING PROXIMITY COMMUNICATION

(71) Applicant: HCL Technologies Limited, Chennai (IN)

(72) Inventors: Bala Aravind Ganesan, Chennai (IN); Ramprasath Venugopal, Chennai (IN)

(73) Assignee: HCL Technologies Limited, Chennai (IN)

( * ) Notice: Subject to any disclaimer, the term of this patent is extended or adjusted under 35 U.S.C. 154(b) by 173 days.

(21) Appl. No.: 13/925,791

(22) Filed: Jun. 24, 2013

(65) Prior Publication Data
US 2014/0220884 A1 Aug. 7, 2014

(51) Int. Cl.
*H04B 7/155* (2006.01)
*H04B 5/00* (2006.01)

(52) U.S. Cl.
CPC .................................... *H04B 5/0031* (2013.01)

(58) Field of Classification Search
CPC ............................ H04W 4/008; H04B 5/0031
See application file for complete search history.

(56) References Cited

U.S. PATENT DOCUMENTS

| 7,905,419 | B2* | 3/2011 | Charrat | H04L 45/54 235/451 |
| 8,385,823 | B2* | 2/2013 | Naniyat | H04W 76/02 370/469 |
| 2013/0052951 | A1* | 2/2013 | Hwang | H04W 72/12 455/41.1 |
| 2013/0102247 | A1* | 4/2013 | Hillan | G06K 7/10297 455/41.1 |
| 2014/0189821 | A1* | 7/2014 | Ying | H04W 12/04 726/5 |
| 2015/0189506 | A1* | 7/2015 | Ying | H04W 12/04 726/7 |
| 2015/0245277 | A1* | 8/2015 | Hassan | H04W 48/02 370/329 |

* cited by examiner

Primary Examiner — Bobbak Safaipour (57) ABSTRACT

The Embodiments provides a system and method for relaying data across electronic devices using Near-Field Communication (NFC). The method includes establishing a communication channel with an electronic device in a network and transmitting a command to access a service associated with the electronic device. Further, the method includes determining parameters associated with the electronic device based on the command and accessing the service associated with the electronic device in accordance to the determined parameters.

16 Claims, 9 Drawing Sheets

INFORMATION RELAY MECHANISM USING PROXIMITY COMMUNICATION

PRIORITY DETAILS

The present application is based on, and claims priority from, Indian Application Number 511/CHE/2013, filed on 6th Feb. 2013, the disclosure of which is hereby incorporated by reference herein.

TECHNICAL FIELD

The embodiments herein relate to Near Field Communication (NFC) devices, and more particularly, to a mechanism for relaying data across electronic devices to perform a desired action using near field communication.

BACKGROUND

Near Field Communication (NFC) can be primarily used to connect electronic devices, access digital content, admission control to specific premises, and make contactless transactions. The NFC communication allows the electronic devices to easily communicate with each other just by a tap/touch, whenever two NFC-enabled devices come into proximity. The electronic devices, such as smart phones, personal digital assistants, laptops, printers, portable equipments, personal computers, tablets, printers, and the like, are commonly equipped with NFC techniques and allow data transfer among each other simultaneously. Such NFC devices can operate in two communication modes such as active mode (in which, the device can be self-powered and also powers passive devices) and passive mode (in which, the device barrows power from active devices).

Further, the electronic devices can allow user(s) to transfer commands and trigger an action for invoking a service in the NFC. For example, a user can buy an e-ticket and bring their mobile device into proximity with a printer to take printout of the e-ticket. Similarly, the user can watch videos, movies, audios, and the like on a tablet and can even resume on a television for bigger screen, when the NFC devices are brought into proximity.

Furthermore, the electronic devices can share information among each other, such as to trigger any event and perform the desired action. This information sometimes can be sufficient to invoke an event for performing the desired action. For example, when the user shares a contact across the mobile phone. The information sometimes can only invoke an event which then collects rest of the data to perform the desired action. For example, when the user sends and prints the file on the printer from the mobile phone.

SUMMARY OF THE EMBODIMENTS

Accordingly the Embodiments provides a method for relaying data across electronic devices using Near-Field Communication (NFC). The method includes establishing a communication channel with an electronic device in a network and transmitting a command to access a service associated with the electronic device. Further, the method includes determining parameters associated with the electronic device based on the command and accessing the service associated with the electronic device in accordance to the determined parameter.

In an embodiment, the parameters include communication channel data and priority data associated with the electronic device. The communication channel includes short-range data communication channel and long-range data communication channel.

Furthermore, the method includes transferring data to the electronic device based on the determined parameters. Furthermore, the method includes managing a list of communication channels associated with the electronic device, switching among the communication channels based on the parameters, and prioritizing the electronic device based on rules.

Furthermore, the method includes constructing the command using a service request received from a user, parsing the command to identify the service request associated with the command, and dispatching the service to be accessed on the electronic device based on the determined parameters.

Accordingly the Embodiments provides a system for relaying data across electronic devices using Near-Field Communication (NFC). The system includes a communication module configured to establish a communication channel with an electronic device in a network, a service module configured to provide service(s) on the electronic device, and a command module configured to generate command(s) to access the service associated with the electronic device. Further, the system includes a controller module configured to determine parameter(s) associated with the electronic device based on the command and access the service associated with the electronic device based on the determined parameter.

Further, the communication module is configured to manage a list of communication channels associated with the electronic device.

Further, the controller module is configured to transfer data to the electronic device based on the parameters and switch among the communication channels based on the determined parameters. Furthermore, the controller module is configured to prioritize the electronic device based on one or more rules.

Further, the command module is configured to construct the command using a service request received from a user. In an embodiment, the command includes the service request, actual data, and the communication channel data associated with the electronic device.

Further, the service module is configured to parse the command to identify the service request associated with the command and dispatch the service to be accessed on the electronic device based on the parameters.

These and other aspects of the embodiments herein will be better understood when considered in conjunction with the following description and the accompanying drawings. It should be understood, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method and system for relaying data across electronic devices using Near Field Communication (NFC). The method includes transmitting a command to access one or more services associated with an electronic device. The command can include or followed by actual data itself or connection setting for a communication channel through which the actual data can be transferred. A connection between a sender and receiver electronic device can be established before transmitting the command using the NFC. Further, the method includes determining one or more parameters associated with the receiver device, such as to transfer data among each other. The parameters described herein can include data communication channel(s) and priority data associated with the electronic devices. Further, the sender electronic device can access the service associated with the receiver device and transfer data among each other based on the determined parameters.

The proposed system and method is simple, scalable, robust, dynamic, and reliable for relaying data across electronic devices to perform a desired action using the NFC. The system and method can be used to create instant connection among the devices just by a user tap/touch. A secured connection among the devices can be established due to close proximity. The system and method can be used to detect appropriate long-range data communication channels to effectively transfer high volume of data between the electronic devices. The system and method can be used to assign appropriate priority to each electronic device based on one or more rules. Such a priority-based system can be used to increase the system response time and provide effective services to the user. Further, the system and method can be used to enable non-NFC enabled devices to NFC enabled devices by using passive NFC tags, which includes configurations/settings for the appropriate data communication channels to communicate data over the NFC channel.

Figure 1:
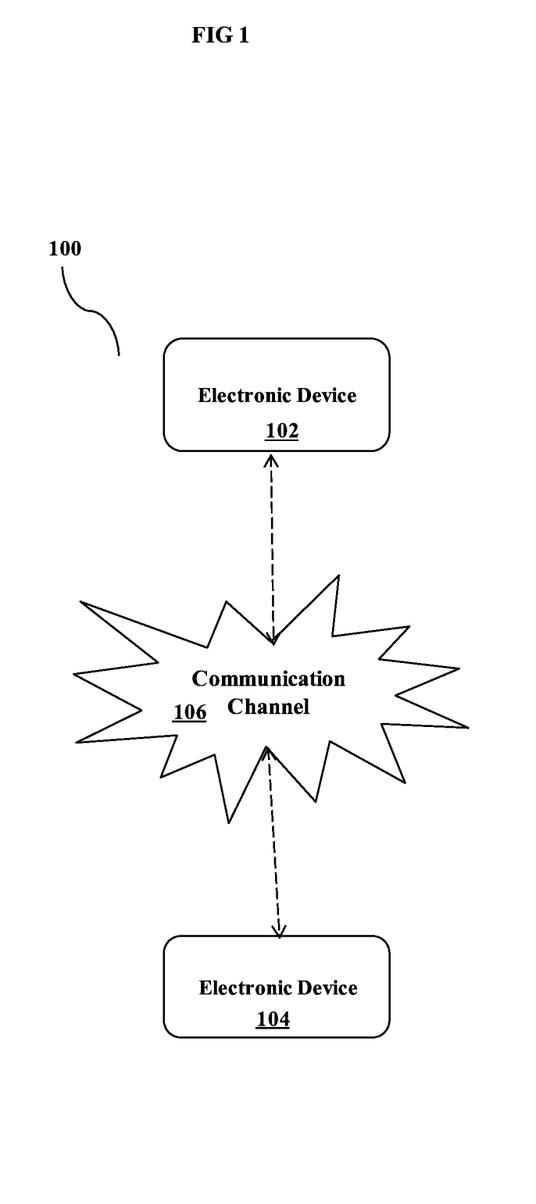
FIG. 1 illustrates generally, among other things, an exemplary system environment, according to the embodiments disclosed herein.

FIG. 1 illustrates generally, among other things, an exemplary system environment 100, according to the embodiments disclosed herein. The system environment 100 can include a plurality of electronic devices, for example, an electronic device 102 and an electronic device 104. However, only two electronic devices are shown in the environment 100, it will be apparent to the person ordinary skilled in the art that the system environment 100 typically includes a larger quantity of electronic devices.

In an embodiment, the electronic devices 102 and 104 described herein can include, for example, but not limited to, mobile phones, televisions, personal digital assistants (PDAs), communicators, wireless electronic devices, laptops, computers, desktops and the like. In the FIG. 1, the electronic devices 102 and 104 shown are capable of communicating with each other using a communication channel 106. In an embodiment, the communication channel 106 described herein can include, for example, but not limited to, short-range wireless communications (for example, Bluetooth, Near Field Communication (NFC), ultra wideband (UWB), wireless local area network (WLAN), Radio-Frequency Identification (RFID), or the like), long-range communications (for example, global system for mobile communication (GSM), general packet radio service (GPRS), Wi-Fi, personal communications service (PCS), wideband code division multiple access (WCDMA), Worldwide interoperability for microwave access (WiMax), or the like), and the like.

In an embodiment, the electronic devices 102 and 104 can be capable of communicating with each other through the NFC technology. User(s) of the electronic devices 102 and 104 can view data displayed on a display screen of the electronic devices 102 and 104. Initially the user can bring the electronic devices 102 and 104 within a predefined distance, such as to communicate among each other using the NFC channel. In an embodiment, the predefined distance described herein can be specific to the standards of a communication technology. For example, in NFC the predefined distance may be less than 10 centimeters. The user may bring the electronic devices 102 and 104 within a 10 centimeter distance of each other, such as to enable exchange of the data between the electronic devices 102 and 104 using the NFC. An instant communication link can be established between the electronic devices 102 and 104 just by the user tap/touch. A secured connection among the devices can be established due to close proximity of the electronic devices 102 and 104. Further, various operations performed by the system are described in conjunction with the FIGS. 4 through 8.

Further, the system environment 100 can include non-NFC enabled electronic devices. The system can be configured to use passive NFC tags to communicate with the non-NFC enabled electronic devices through the NFC channel. The passive NFC tags described herein can include configurations/settings for the appropriate data communication channels associated with the non-NFC enabled electronic devices to communicate data over the NFC channel. The various operations performed by the system are described in conjunction with the FIG. 5.

Figure 2:
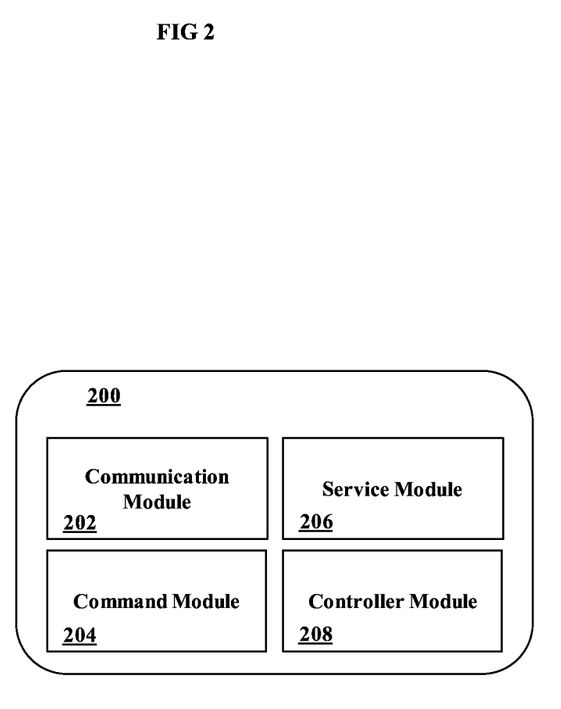
FIG. 2 illustrates generally, among other things, different modules of the system as described in the FIG. 1, according to embodiments described herein.

FIG. 2 illustrates generally, among other things, different modules 200 of the system as described in the FIG. 1, according to embodiments described herein. The system can include a communication module 202, a command module 204, a service module 206, and a controller module 208.

In an embodiment, the communication module 202 can be configured to allow communication between the electronic devices 102 and 104 over the communication channel 106. The communication module 202 can be configured to establish a communication channel between the electronic devices 102 and 104, when both the devices are brought into proximity. The communication module 202 can be configured to include appropriate interfaces/communication channels to communicate with various electronic devices and virtually transfer data among each other. The communication module 202 can be configured to identify the available data communication channel in the electronic devices and enable one of the appropriate data communication channel for transferring data among the electronic devices 102 and 104.

Further, communication module 102 can be configured to maintain a list of available data channels with the electronic devices 102 and 104. In an embodiment, when a user wants to send huge data to the target electronic device, the communication module can be configured to provide optimal data communication channel settings/configurations for transferring the data. For example, a mobile device can have Wi-Fi and Bluetooth as data communications channel. The communication module can be configured to include a list including these two data communications channel information. If the user wants to transfer huge from the electronic device 102 to the electronic device 104 then the communication module 202 can be configured to use the Wi-Fi data communication channel.

In an embodiment, the command module 204 can be configured to generate commands for communication among the electronic devices 102 and 104. The command module 204 can be configured to construct appropriate commands including the user desired request information, such as to transfer data among the electronic devices. In an embodiment, the command described herein can be configured to include or followed by actual data itself or connection setting/configuration for a communication channel through which the actual data can be transferred. The command module 204 can be configured to allow the electronic device user to customize the command by selecting desired data to be transferred. Further, the command module 204 can be configured to communicate with different service applications present in the electronic device, such as to generate appropriate commands including actual data or connection setting for the communication channel through which the actual data can be transferred.

In an embodiment, the service module 206 can be configured to provide one or more services to the electronic devices, such as to transfer and process the desired data. The one or more services described herein can include for example, but not limited to, web services, financial services, transaction services, social services, multimedia services, business services, economic services, technical services, religious services, data transfer services, printing services, e-commerce services, clipboard services, printing services, or any other type of services. The service module 206 can be configured to parse the contents of the command, received from the command module 204, to identity the data associated with the commands. Further, the service module 206 can be configured to initiate/dispatch the service based on the service data associated with the command.

In an embodiment, the controller module 208 can be configured to monitor for incoming NFC connections from the electronic devices 102 and 104. Upon detecting any NFC device (such as the electronic devices 102 and 104) in proximity, the controller module 208 is configured to communicate instructions to the command module 204 and the service manger 206 respectively.

The controller module 208, in communication with the communication module 202, can be configured to establish a communication session between the electronic devices 102 and 104. A secured connection among the devices can be established due to close proximity of the electronic devices 102 and 104. The controller module 208 can be configured to prioritize the electronic devices based on one or more rules and communication channels associated with the electronic devices. The controller module 208, in communication with the command module 204, can be configured to construct a command including a request to access a service associated with the electronic device. The controller module 208 can be configured to determine the parameters associated with the electronic device based on the command data. In an embodiment, the parameters described herein can include for example, the communication channel data and priority data associated with the electronic devices. Furthermore, the controller module 208 can be configured to allow the electronic device 102 to access the service associated with the electronic device based on the determined parameters associated with the electronic device. The detailed operations performed by the modules 200 are described in conjunction with the FIGS. 4 through 8.

Figure 3:
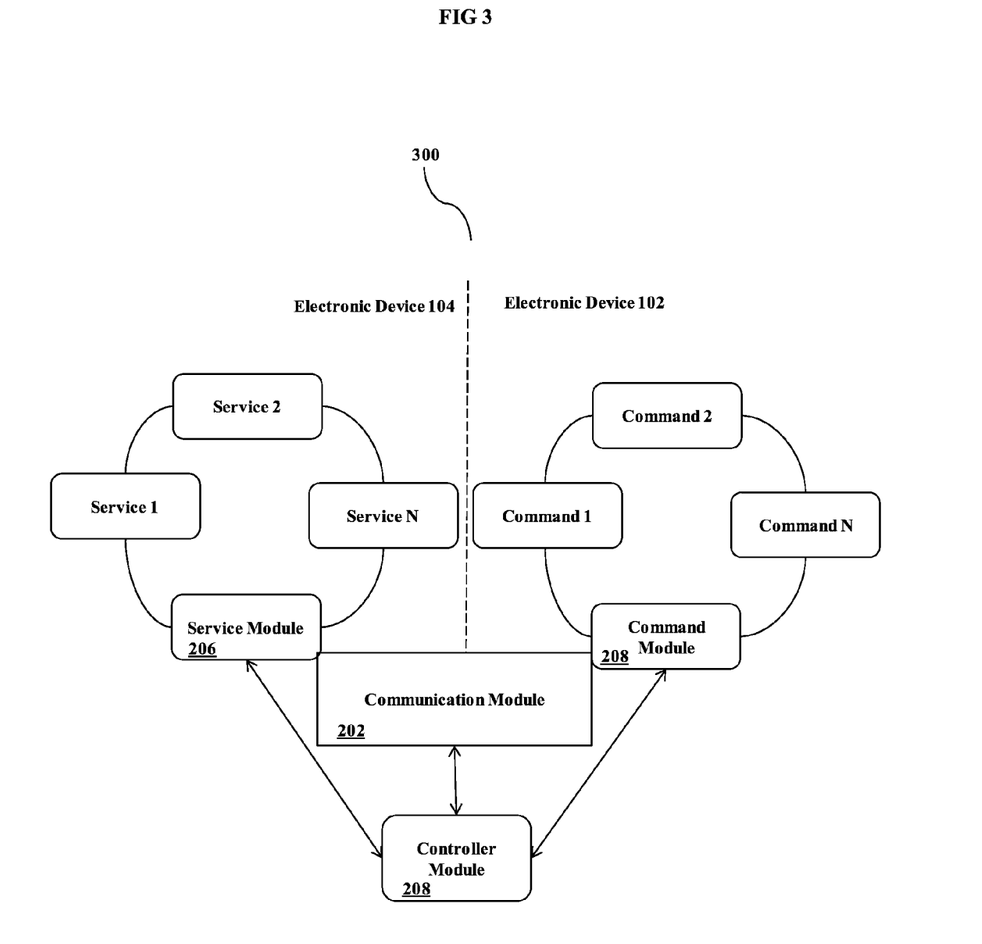
FIG. 3 is a schematic diagram illustrating generally, an exemplary high level architecture of the system as described in the FIG. 2, according to the embodiments disclosed herein.

FIG. 3 is a schematic diagram illustrating generally, an exemplary high level architecture 300 of the system as described in the FIGS. 1 and 2, according to the embodiments disclosed herein. In an embodiment, as shown in the FIG. 3, a connection between the electronic devices 102 and 104 can be created such as to transfer data from the electronic device 102 to the electronic device 104. The controller module 208 can be configured to monitor the electronic devices 102 and 104. Upon detecting the electronic devices 102 and 104 proximity to each other, the controller module 208 (in communication with the communication module 202) can be configured to create a secure communication between the electronic devices 102 and 104. The controller module 208 communicates instructions to the command module 204 upon detecting the electronic devices 102 and 104 proximity to each other. In an embodiment, the command module 204 can be configured to construct a command including a service request, communication channels configuration data, actual data, and the like, such as to initiate transfer of data from the electronic devices 102 to the electronic devices 104.

Furthermore, the controller module 208, in communication with the communication module 202, can be configured to send the command from the electronic device 102 to the electronic devices 104. Further, the controller module 208 can be configured to determine the parameters associated with the electronic device 104. The parameters described herein can include for example, the communication channels data and the priority data associated with the electronic devices 104. The service module 206, in communication with the controller module 208, can be configured to receive the command from the electronic devices 102. The service module 206 can be configured to parse the command and identify the data/service request associated with the command. Furthermore, the service module 206, in communication with the controller module 208, can be configured to dispatch the service associated with the electronic devices 104 to be accessed by the electronic devices 102. The controller module 208 can be configured to allow the electronic devices 102 to use appropriate data communication channel to access the service and transfer the data based on the determined parameters associated with the electronic devices 104.

Figure 4:
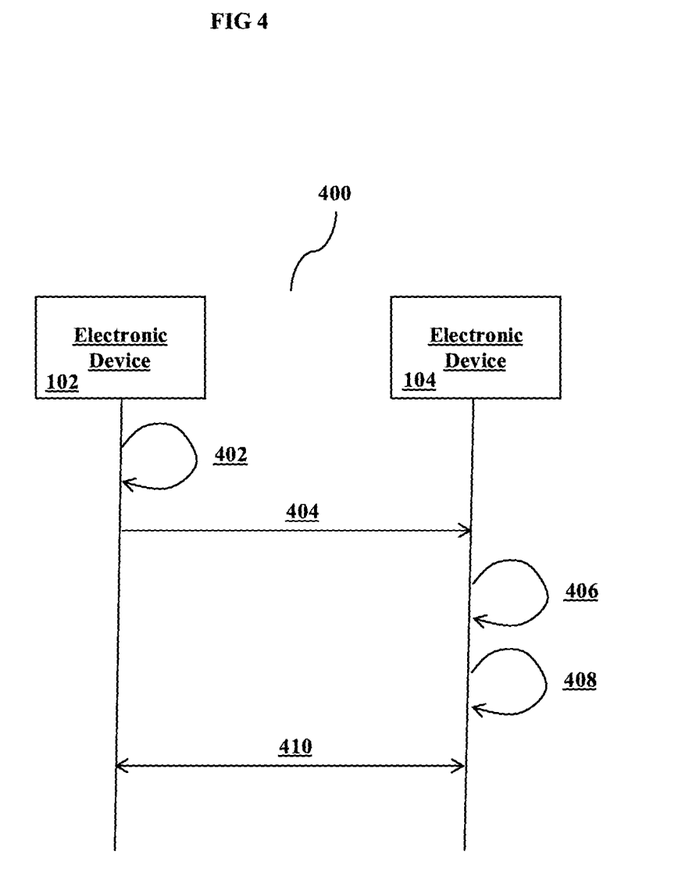
FIG. 4 is a sequence diagram illustrating operations performed by the system including active electronic devices, according to the embodiments disclosed herein.

FIG. 4 is a sequence diagram illustrating operations 400 performed by the system including active electronic devices, according to the embodiments disclosed herein. In the FIG. 4, the electronic device 102 (initiator) and the electronic device 104 (target) are considered as active electronic devices, where both the devices are NFC enabled. In an embodiment, at 402, the electronic device 102 can be configured to receive a service request from the user and constructs a command including the user desired service request. In an example, the controller module 208 can be configured to allow the user to input the desired information. The controller module 208, in communication with the command module 204, can be configured to construct the command including the user desired service request. The command described herein can be configured to include the user desired service request data, actual data, all (or some of) the data communication channel setting/configuration associated with the electronic device 102, and any other data used by the system to manage optimal data communication between the electronic devices 102 and 104.

In an embodiment, at 404, the electronic device 102 can be configured to establish a connection with the electronic device 104, such as to transfer data and access service(s) associated with the electronic device 104. In an example, the controller module 208, in communication with the communication module 202, can be configured to establish a communication link between the electronic device 102 and the electronic device 104. The electronic devices 102 and/or 104 can be brought proximity to each other to create a secured communication just by the user tap/touch.

In an embodiment, at 406, the electronic device 104 can be configured to identity the service request and dispatch the respective service. In an example, the service module 206 can be configured to receive the command send by the electronic device 102 and parse the command to identify the user desired service request. Further, the controller module 208, in communication with the service module 206, can be configured to dispatch the desired service on the electronic device 104.

In an embodiment, at 408, the electronic device 104 can be configured to determine the data channels associated with it. In an example, the controller module 208 can be configured to determine the data channels associated with the electronic device 104. When the user request includes a high volume of actual data, the controller module 208 can be configured to query the communication module 202 to get the optimal data communication channel settings/configurations. The communication module 202 can be configured to include a list of data channels associated with the electronic device 104. For example, if the electronic device 104 includes a Wi-Fi and NFC data communication channels then the communication module 202 can be configured to include a list of the two data communication channels. The communication module 202 can be configured to provide an optimal data communication channel based on the command data (including service and actual data) and speed required to transfer the data among the electronic devices.

In an embodiment, at 410, the electronic device 104 can be configured to switch to another data communication channel to provide optimized data communication between the electronic devices 102 and 104. In an example, when a high volume of data needs to be transferred among the electronic devices 102 and 104, the communication module 202 can be configured to send the appropriate data channel setting/configuration to the controller module 208. Alternatively, the electronic device 102 can be configured to send all (or some of) the available data communication channels settings/configuration to the electronic device 104 through the command, such as to allow the electronic device 104 to switch and connect with the optimal data communication channel.

In an embodiment, 412, the electronic devices 102 and 104 can transfer data among each other using the optimized data communication channel. In an example, the controller module 208, in communication with the communication module 202, can be configured to create an optimized data communication link between the electronic devices 102 and 104, such as to transfer the data among each other.

Figure 5:
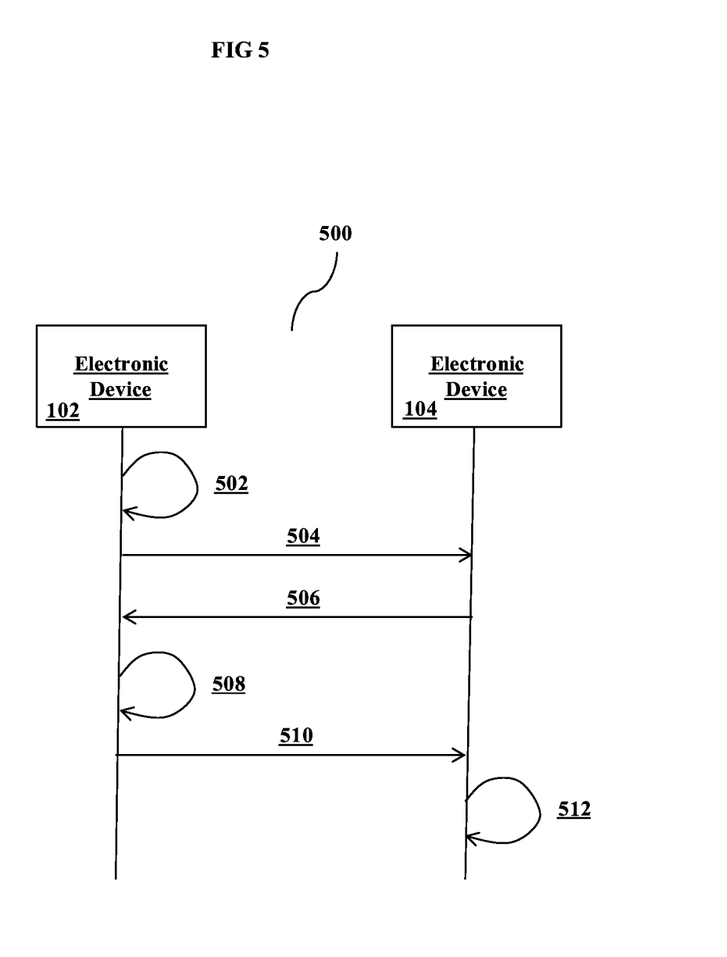
FIG. 5 is a sequence diagram illustrating operations performed by the system including passive electronic devices, according to the embodiments disclosed herein.

FIG. 5 is a sequence diagram illustrating operations 500 performed by the system including passive an electronic device, according to the embodiments disclosed herein. In the FIG. 5, the electronic device 102 (initiator) can be an active electronic device (NFC enabled device) and the electronic device 104 (target) can be a passive electronic device (non-NFC enabled device). In an embodiment, at 502, the electronic device 102 can be configured to receive a service request from the user and constructs a command including the user desired service request. In an example, the controller module 208 can be configured to allow the user to input the desired service information. The controller module 208, in communication with the command module 204, can be configured to construct the command including the user desired service request. The command described herein can be configured to include the user desired service request data, actual data, all (or some of) the data communication channel setting/configuration associated with the electronic device 102, and any other data used by the system to manage optimal data communication between the electronic devices 102 and 104.

In an embodiment, at 504, the electronic device 102 can be configured to establish a connection with the electronic device 104, such as to transfer the data and access service(s) associated with the electronic device 104. In an example, the controller module 208, in communication with the communication module 202, can be configured to establish a communication link between the electronic device 102 and the electronic device 104. The electronic devices 102 and/or 104 can be brought proximity to each other to create a secured communication just by the user tap/touch. The controller module 208 can be configured to use passive NFC tags to enable the passive electronic device 104 as a NFC enabled device and communicate among each other. The passive NFC tags described herein can include configurations/settings for the appropriate data communication channels associated with the non-NFC enabled electronic devices to communicate data over the NFC channel.

In an embodiment, at 506, the electronic device 104 can be configured to determine the data channels associated with it using the passive tags and sent the channels information to the electronic device 102. In an example, the controller module 208, in communication with the communication module 202, can be configured to determine the data channels associated with the electronic device 104. The communication module 202 can be configured to provide an optimal data communication channel based on the command data (including service and actual data) and speed required to transfer the data among the electronic devices.

In an embodiment, at 508, the electronic device 102 can be configured to switch to optimal data communication channel based on the data channels information received from the electronic device 104. In an example, the controller module 208, in communication with the communication module 202, can be configured to receive configurations/settings for the appropriate data communication channels associated with the non-NFC enabled electronic devices 104 using the NFC tags. The controller module 208 can configure the electronic device 102 to switch to the data communication channel associated with the electronic device 104 using the passive NFC tags, such as to communicate with the passive electronic device 104 data over the NFC channel.

In an embodiment, at 510, the electronic device 102 can be configured to transfer the actual data to the electronic device 104. In an example, the controller module 208 can be configured to send the commands including the actual data to the electronic device 104 and access the desired service.

In an embodiment, at 512, the electronic device 104 can be configured to identity the service request and dispatch the respective service. In an example, the service module 206 can be configured to receive the command send by the electronic device 102 and parse the command to identify the user desired service request. Further, the controller module 208, in communication with the service module 206, can be configured to dispatch the desired service on the electronic device 104.

Figure 6:
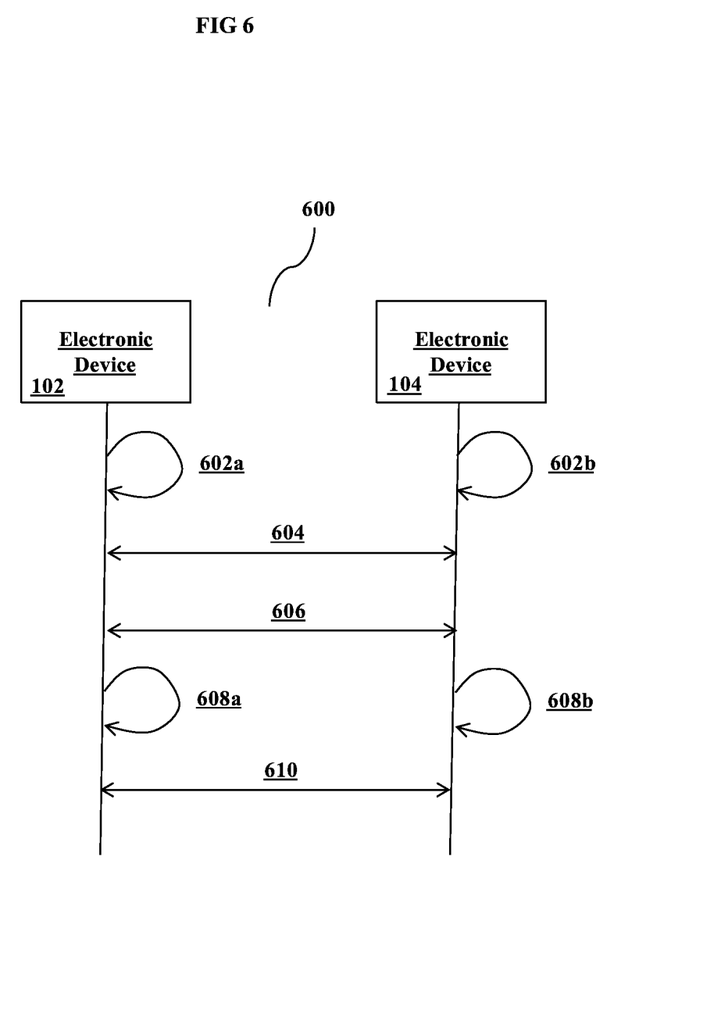
FIG. 6 is a sequence diagram illustrating operations performed by the system including electronic devices with same priorities, according to the embodiments disclosed herein.

FIG. 6 is a sequence diagram illustrating operations 600 performed by the system including electronic devices with same priorities, according to the embodiments disclosed herein. The controller module 208 can be configured to initially assign priorities (a value) to the electronic devices based on the one or more rules. The one or more rules can be configured to include different combination of elements such as, for example, but not limited to, service(s) offered by the electronic device, communication channels efficiency, link quality, range, device cost, time, workload, security data, congestion, optimization, performance, electronic device characteristics, priority data, and the like. The controller module 208 can be configured to execute various combinations of the rule elements to assign priorities to the electronic devices. Such a rule-based model and priority-based system can be used to increase the system response time and provide effective services to the user. In the FIG. 6, the electronic device 102 (initiator) and the electronic device 104 (target) are considered as electronic devices with same priority values.

In an embodiment, at 602a, the electronic device 102 can be configured to receive a service request from the user and constructs a command including the user desired service request. In an example, the controller module 208 can be configured to allow the user of the electronic device 102 to input the desired service information. The controller module 208, in communication with the command module 204, can be configured to construct the command including the user desired service request. The command described herein can be configured to include the user desired service request data, actual data, all (or some of) the data communication channel setting/configuration associated with the electronic device 102, and any other data used by the system to manage optimal data communication between the electronic devices 102 and 104.

In an embodiment, at 602b, the electronic device 104 can be configured to receive a service request from the user and constructs a command including the user desired service request. In an example, the controller module 208 can be configured to allow the user of the electronic device 104 to input the desired service information. The service requested by the electronic device 104 can be the same (or different) service as requested by the electronic device 102. The controller module 208, in communication with the command module 204, can be configured to construct the command including the user desired service request. The command described herein can be configured to include the user desired service request data, actual data, all (or some of) the data communication channel setting/configuration associated with the electronic device 104, and any other data used by the system to manage optimal data communication between the electronic devices 102 and 104.

In an embodiment, at 604, the electronic devices 102 and/or 104 can be configured to establish a connection among each other, such as to transfer the data and access service(s) associated with the each other. In an example, the controller module 208, in communication with the communication module 202, can be configured to establish a communication link between the electronic device 102 and the electronic device 104. The electronic devices 102 and/or 104 can be brought proximity to each other to create a secured communication just by the user tap/touch.

In an embodiment, at 606, the controller module 208 can be configured to determine the priority parameter associated with the electronic devices 102 and 104. In an example, as both the electronic devices 102 and 104 includes same priority value, the controller module 208 can be configured to dispatch the desired services (may be same or different services) on the electronic devices 102 and 104.

In an embodiment, at 608a, the electronic device 102 can be configured to identity the service request and dispatch the respective service. In an example, the service module 206 can be configured to receive the command send by the electronic device 104 and parse the command to identify the user desired service request. Further, the controller module 208, in communication with the service module 206, can be configured to dispatch the desired service on the electronic device 102.

In an embodiment, at 608b, the electronic device 104 can be configured to identity the service request and dispatch the respective service. In an example, the service module 206 can be configured to receive the command send by the electronic device 104 and parse the command to identify the user desired service request. Further, the controller module 208, in communication with the service module 206, can be configured to dispatch the desired service on the electronic device 104.

In an embodiment, at 610, the electronic devices 102 and 104 can be configured to transfer the actual data among each other. In an example, the controller module 208 can be configured to send the commands including the actual data between the electronic devices 102 and 104.

Figure 7:
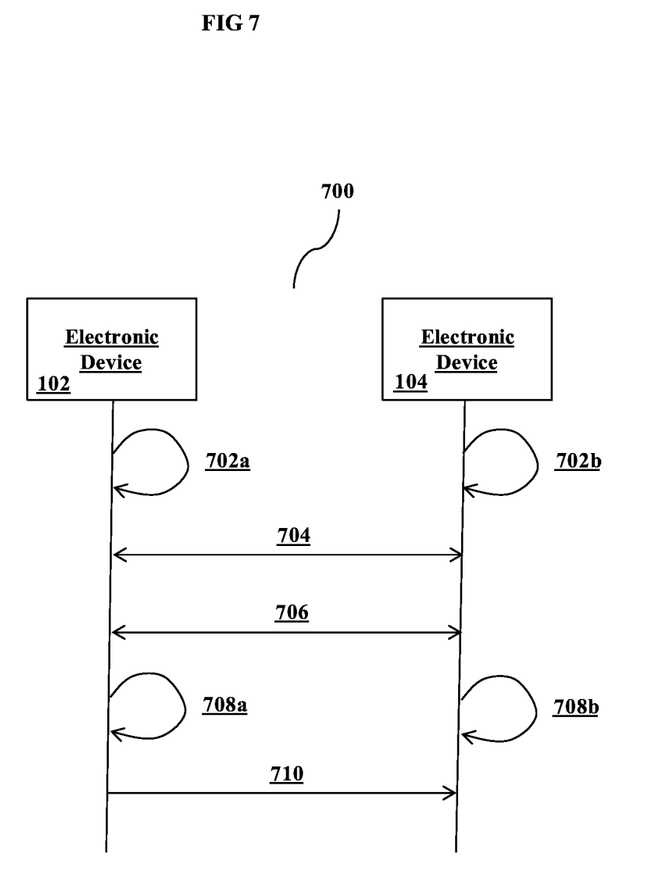
FIG. 7 is a sequence diagram illustrating operations performed by the system including electronic devices with different priorities, according to the embodiments disclosed herein.

FIG. 7 is a sequence diagram illustrating operations 700 performed by the system including electronic devices with different priorities, according to the embodiments disclosed herein. The controller module 208 can be configured to initially assign priorities (a value) to the electronic devices based on the one or more rules. The one or more rules can be configured to include different combination of elements such as, for example, but not limited to, service(s) offered by the electronic device, communication channels efficiency, link quality, range, device cost, time, workload, security data, congestion, optimization, performance, electronic device characteristics, and the like. The controller module 208 can be configured to execute various combinations of the rule elements to assign priorities to the electronic devices. In the FIG. 7, the electronic device 102 (initiator) and the electronic device 104 (target) are considered as electronic devices with different priority values.

In an embodiment, at 702a, the electronic device 102 can be configured to receive a service request from the user and constructs a command including the user desired service request. In an example, the controller module 208 can be configured to allow the user of the electronic device 102 to input the desired service information. The controller module 208, in communication with the command module 204, can be configured to construct the command including the user desired service request. The command described herein can be configured to include the user desired service request data, actual data, all (or some of) the data communication channel setting/configuration associated with the electronic device 102, and any other data used by the system to manage optimal data communication between the electronic devices 102 and 104.

In an embodiment, at 702b, the electronic device 104 can be configured to receive a service request from the user and constructs a command including the user desired service request. In an example, the controller module 208 can be configured to allow the user of the electronic device 104 to input the desired service information. The service requested by the electronic device 104 can be the same (or different) service as requested by the electronic device 102. The controller module 208, in communication with the command module 204, can be configured to construct the command including the user desired service request. The command described herein can be configured to include the user desired service request data, actual data, all (or some of) the data communication channel setting/configuration associated with the electronic device 104, and any other data used by the system to manage optimal data communication between the electronic devices 102 and 104.

In an embodiment, at 704, the electronic devices 102 and/or 104 can be configured to establish a connection among each other, such as to transfer the data and access service(s) associated with the each other. In an example, the controller module 208, in communication with the communication module 202, can be configured to establish a communication link between the electronic device 102 and the electronic device 104. The electronic devices 102 and/or 104 can be brought proximity to each other to create a secured communication just by the user tap/touch.

In an embodiment, at 706, the controller module 208 can be configured to determine the priority parameter associated with the electronic devices 102 and 104.

In an embodiment, at 708a, upon determining that the electronic device 102 includes higher priority than the electronic device 104, the electronic device 102 may not dispatch the service (may be same or different) requested by the electronic device 104. In an embodiment, at 708b, the electronic device 104 can be configured to identity the service request and dispatch the respective service. In an example, upon determining that the electronic device 102 includes higher priority than the electronic device 104, the service module 206 can be configured to receive the command send by the electronic device 104 and parse the command to identify the user desired service request. Further, the controller module 208, in communication with the service module 206, can be configured to dispatch the desired service on the electronic device 104.

In an embodiment, at 710, the electronic device 102 can be configured to transfer the actual data to the electronic device 104. In an example, the controller module 208 can be configured to send the commands including the actual data to the electronic device 104 and access the desired service.

The various actions, steps, blocks, or acts described with respect to the FIGS. 4 through 7 can be performed in sequential order, in random order, simultaneously, parallel, or a combination thereof. Further, in some embodiments, some of the steps can be omitted, skipped, added, or modified without departing from the scope of the Embodiments.

Figure 8:
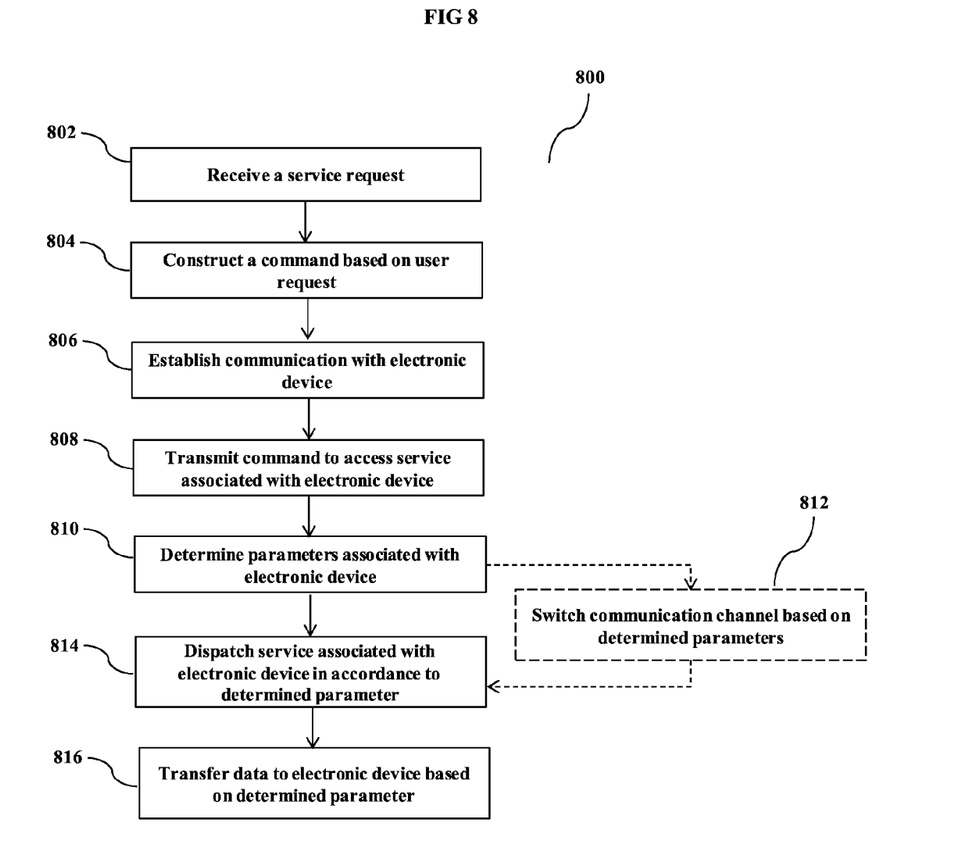
FIG. 8 is a flowchart illustrating a method for relaying data across electronic devices using near field communication, according to the embodiments disclosed herein.

FIG. 8 is a flowchart illustrating a method 800 for relaying data across the electronic devices using the NFC, according to the embodiments disclosed herein. The various steps performed in the flowchart are summarized in blocks, where some of the steps can be performed by the electronic device 102 and some by the electronic device 104. Further, the flowchart provides a basis for a control program, which can be easily implemented by a person skilled in art using a microprocessor, microcontroller, other network devices, or a combination thereof.

In an embodiment, at step 802, the method 800 includes receiving a service request. In an example, the method 800 allows the electronic device 102 allow the user to input the desired service information. In an embodiment, at 804, the method 800 includes constructing a command based on the user request. In an example, the method 800 allows the electronic device 102 to construct the command including the user desired service request. The command described herein can be configured to include the user desired service request data, actual data, all (or some of) the data communication channel setting/configuration associated with the electronic device 102, and any other data used by the system to manage optimal data communication between the electronic devices 102 and 104.

In an embodiment, at step 806, the method 800 includes establishing communication with electronic device. In an example, the method 800 allows the electronic device 102 to establish a connection with the electronic device 104, such as to transfer data and access service(s) associated with the electronic device 104. The electronic devices 102 and/or 104 can be brought proximity to each other to create a secured communication just by the user tap/touch.

In an embodiment, at step 808, the method 800 includes transmitting the command to access service associated with electronic device 104. In an example, the method 800 allows the electronic device 102 to transfer the constructed command to the electronic device 102, such as to access the services associated with the electronic device 104.

In an embodiment, at step 810, the method 800 includes determining the one or more parameters associated with electronic devices 102 and 104. In an example, the method 800 allows the electronic device 102 to determine the one or more parameters associated with the electronic device 104. The parameters described herein can include for example, but not limited to, the data communication channels and priory data associated with the electronic devices. An optimal data communication channel may be chosen based on the command data (including service and actual data) and speed required to transfer the data among the electronic devices, such as to transfer data between the electronic devices 102 and 104.

In an embodiment, at step 812, the method 800 includes switching communication channel based on the determined parameters. In an example, the method 800 allows the electronic device 102 and/or 104 to switch the data communication channel to provide optimized data communication between the electronic devices 102 and 104. When a high volume of data needs to be transferred among the electronic devices 102 and 104, appropriate data communication channel can be chosen by the electronic devices.

In an embodiment, at step 814, the method 800 includes dispatching the service associated with the electronic device 104 in accordance to the determined parameter. In an example, the method allows the electronic device 104 to receive the command send by the electronic device 102 and parse the command to identify the user desired service request.

In an embodiment, at step 816, the method 800 includes transferring actual data to the electronic device 104 based on the determined parameters. In an example, the method 800 allows the electronic device 102 to use the optimized communication channel and transfer the data to the electronic device 104. The electronic device 102 sends the commands including the actual data to the electronic device 104 and access the desired service.

The various steps, acts, blocks, units, and actions of the method 800 may be performed in the order presented, in a different order or simultaneously. Further, in some embodiments, some actions listed in the FIG. 8 may be omitted, added, skipped, or modified without departing from the scope of the Embodiments.

Though the FIGS. 1 through 8 are illustrated with respect to two electronic devices but the Embodiments can be performed among various different electronic devices such as to access multiple services at a time.

Figure 9:
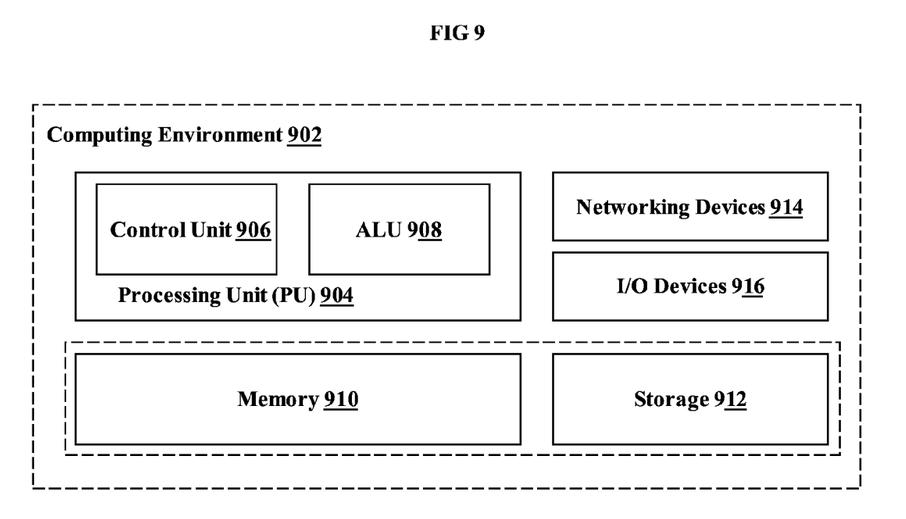
FIG. 9 illustrates a computing environment implementing the method and system as disclosed in the embodiments herein.

FIG. 9 illustrates a computing environment 902 implementing the method and systems as disclosed in the embodiments herein. As depicted the computing environment 902 comprises at least one processing unit 904 that is equipped with a control unit 906 and an Arithmetic Logic Unit (ALU) 908, a memory 910, a storage unit 912, plurality of networking devices 914 and a plurality Input output (I/O) devices 916. The processing unit 904 is responsible for processing the instructions of the algorithm. The processing unit 904 receives commands from the control unit 906 in order to perform its processing. Further, any logical and arithmetic operations involved in the execution of the instructions are computed with the help of the ALU 908.

The overall computing environment 902 can be composed of multiple homogeneous and/or heterogeneous cores, multiple CPUs of different kinds, special media and other accelerators. The processing unit 904 is responsible for processing the instructions of the algorithm. Further, the plurality of processing units 904 may be located on a single chip or over multiple chips.

The algorithm comprising of instructions and codes required for the implementation are stored in either the memory unit 910 or the storage 912 or both. At the time of execution, the instructions may be fetched from the corresponding memory 910 and/or storage 912, and executed by the processing unit 904.

In case of any hardware implementations various networking devices 914 or external I/O devices 916 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1 through 6 include blocks, steps, operations, and acts, which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for relaying data across a plurality of electronic devices using Near-Field Communication (NFC), the method comprising:
    establishing a communication channel, by a communication module, with at least one electronic device in a network, wherein said communication channel is configured to carry at least priority data associated with at least one electronic device;
    generating, by a command module at least one command to access a service associated with said at least one electronic device;
    transmitting, by a service module said command to access said service associated with said at least one electronic device;
    determining, by a controller module, at least one parameter associated with said at least one electronic device based on said at least one command;
    accessing said service, by said controller module, associated with said at least one electronic device in accordance to said at least one determined parameter;
    managing a list of communication channels associated with said at least one electronic device; and
    dispatching said service to be accessed on said at least one electronic device based on said at least one parameter.

2. The method of claim 1, wherein said communication channel comprises short-range data communication channel and long-range data communication channel.

3. The method of claim 1, wherein said method further comprises transferring data to said at least one electronic device based on said at least one determined parameter.

4. The method of claim 1, wherein said method further comprises switching to said at least one communication channel based on said at least one parameter.

5. The method of claim 1, wherein said method further comprises prioritizing said at least one electronic device based on at least one rule.

6. The method of claim 1, wherein said method further comprises constructing said command using a service request.

7. The method of claim 1, wherein said command comprises at least one of said service request, said data, and said communication channel data associated with said at least one electronic device.

8. The method of claim 1, wherein said method further comprises parsing said command to identify said service request associated with said command.

9. A system for relaying data across electronic devices using Near-Field Communication (NFC), the system comprising:
    a communication module configured to establish a communication channel with at least one electronic device in a network, wherein said communication channel is configured to carry at least priority data associated with at least one electronic device;
    a service module configured to provide at least one service on said at least one electronic device;
    a command module configured to generate at least one command to access said service associated with said at least one electronic device;
    said service module configured to transmit said command to access said service associated with said at least one electronic device;
    a controller module configured to determine at least one parameter associated with said at least one electronic device based on said at least one command, and access said service associated with said at least one electronic device based on said at least one determined parameter;

said controller module configured to access said service, associated with said at least one electronic device in accordance to said at least one determined parameter;

said communication module is further configured to manage a list of communication channels associated with said at least one electronic device;

said service module is further configured to dispatch said service to be accessed on said at least one electronic device based on said at least one parameter.

10. The system of claim 9, wherein said communication channel comprises short-range data communication channel and long-range data communication channel.

11. The system of claim 9, wherein said controller module is further configured to transfer data to said at least one electronic device based on said at least one determined parameter.

12. The system of claim 9, wherein said controller module is further configured to switch to said at least one communication channel based on said at least one determined parameter.

13. The system of claim 9, wherein said controller module is further configured to prioritize said at least one electronic device based on at least one rule.

14. The system of claim 9, wherein said command module is further configured to construct said command using a service request.

15. The system of claim 9, wherein said command comprises at least one of said service request, said data, and said communication channel data associated with said at least one electronic device.

16. The system of claim 9, wherein said service module is further configured to parse said command to identify said service request associated with said command.

* * * * *